Dec. 14, 1965  W. F. SCHREIBER ETAL  3,222,921
DOUBLE SEAM TESTING DEVICE
Filed Dec. 13, 1962  3 Sheets-Sheet 1
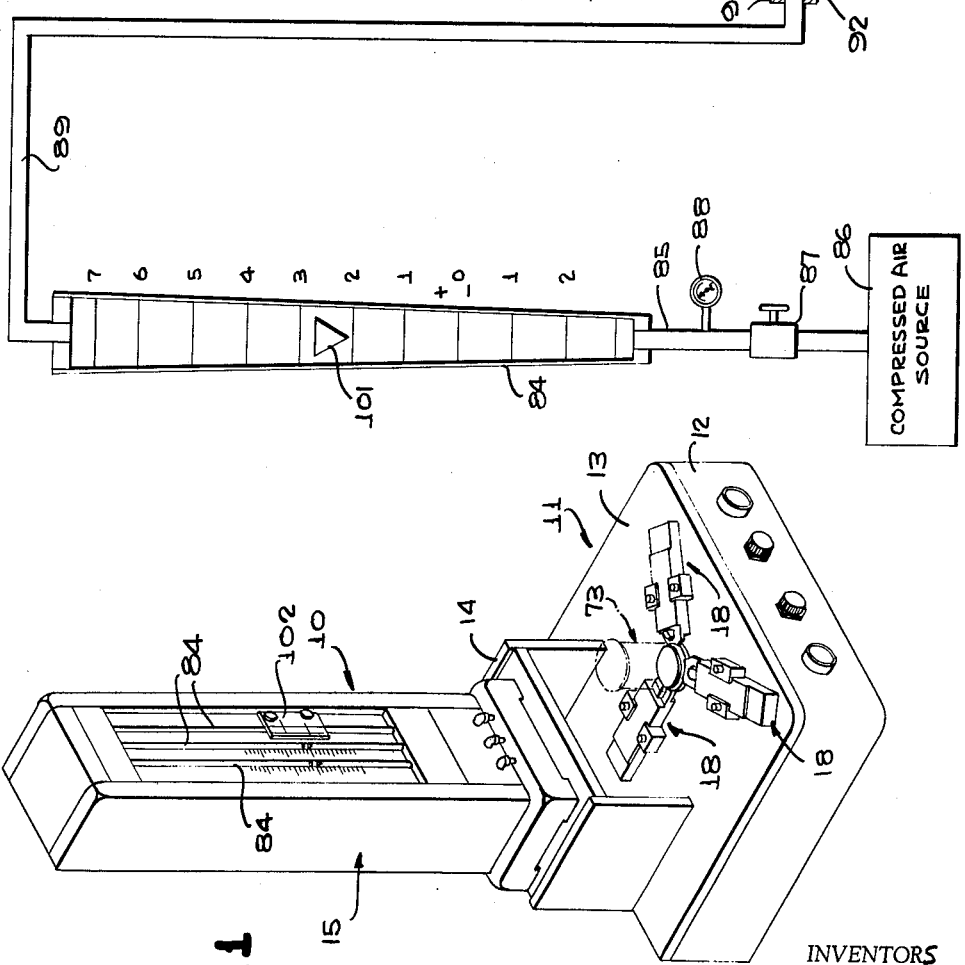
INVENTORS
WARREN F. SCHREIBER
& JAMES M. SCHMIDT
BY
Mason, Porter, Diller & Stewart
ATTORNEYS

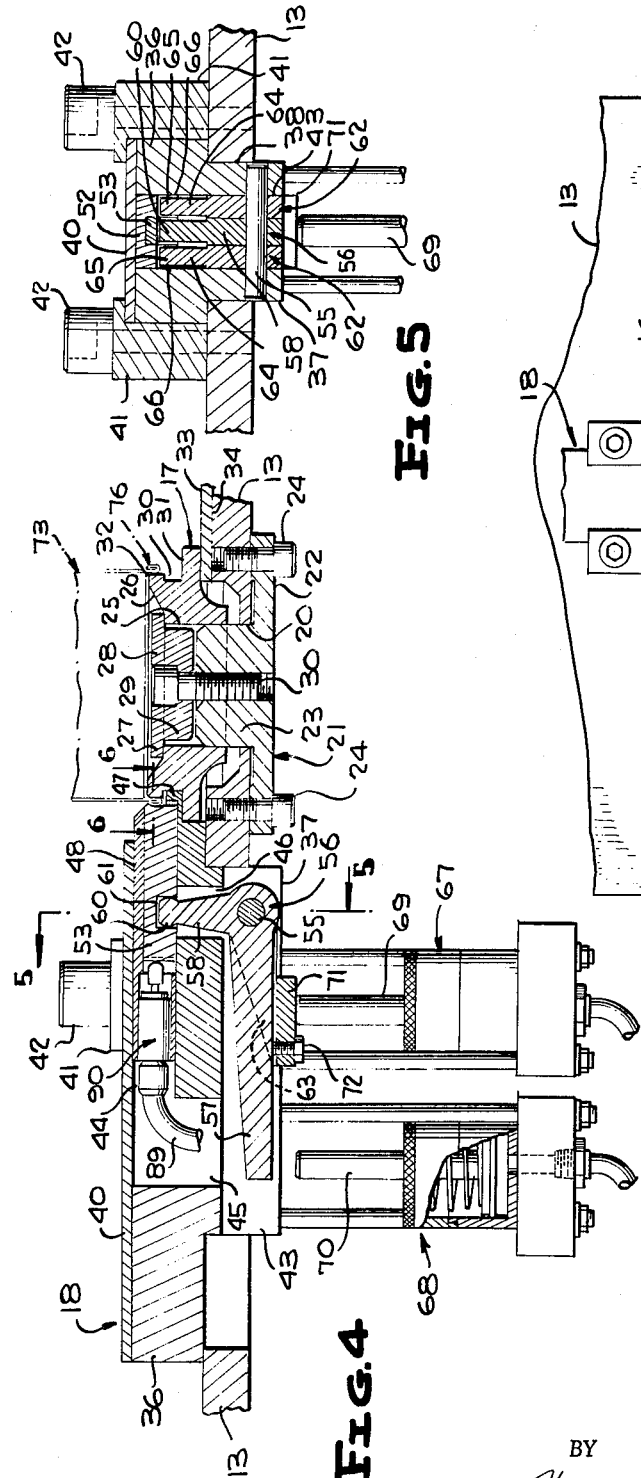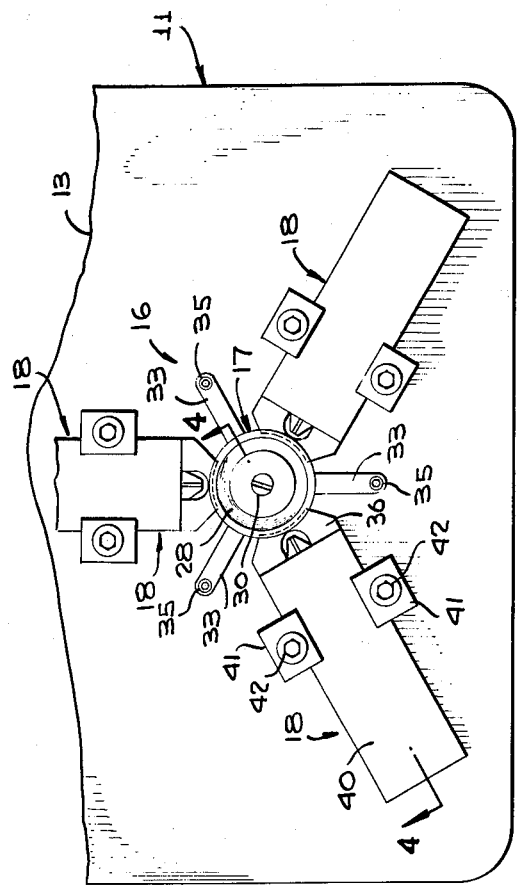

Dec. 14, 1965  W. F. SCHREIBER ETAL  3,222,921
DOUBLE SEAM TESTING DEVICE
Filed Dec. 13, 1962  3 Sheets-Sheet 3
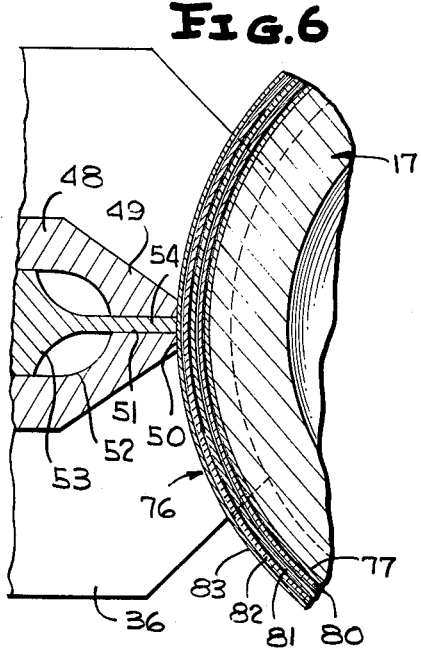
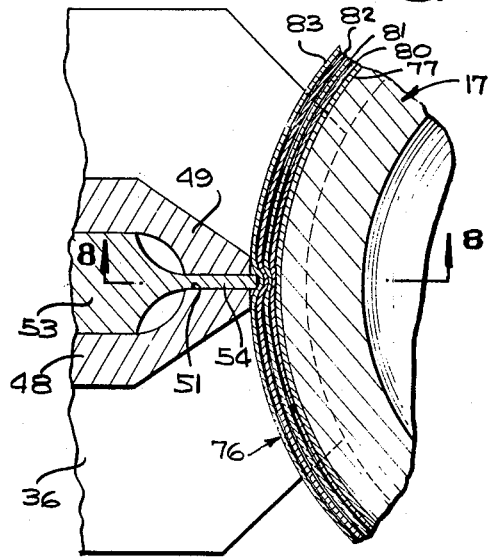
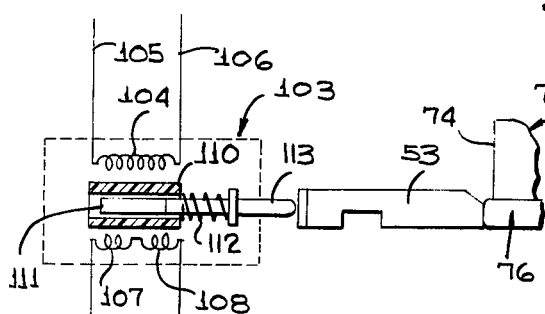
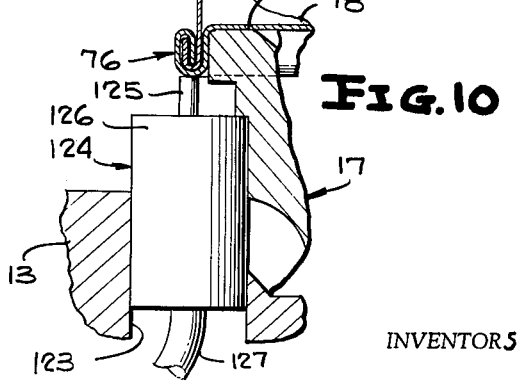
INVENTORS
WARREN F. SCHREIBER
& JAMES M. SCHMIDT
BY
Mason, Porter, Diller & Stewart
ATTORNEYS

United States Patent Office 3,222,921
Patented Dec. 14, 1965

3,222,921
DOUBLE SEAM TESTING DEVICE
Warren F. Schreiber, Darien, Conn., and James M. Schmidt, Broomall, Pa., assignors to Continental Can Company, Inc., New York, N.Y., a corporation of New York
Filed Dec. 13, 1962, Ser. No. 244,306
16 Claims. (Cl. 73—94)

This invention relates in general to new and useful improvements in testing apparatus, and more particularly to a testing device particularly adapted for the testing of tightness of seams such as double seams which are found in metal cans.

In the manufacture of cans, the can body is either provided with an integral end or has an end double-seamed thereto at a factory. The open can is then shipped to the customer's plant and after the can has been filled, the open end is closed by the double seaming of a second end to the can body. It is readily apparent that if the double seaming operation on a can end has not been properly executed, the result might be that the double seam will leak. Such a leakage will allow the flow of the contents of the can outwardly, or the entrance of air, bacteria or other contaminants into the can.

At the present, the commonly used method of determining seam tightness requires that the seam be torn apart and the inside surface of the disengaged hooks of the double seam be observed and evaluated for the presence of wrinkles.

The relative portion of the end hook containing wrinkles is used as a measure of the degree of tightness. It will be apparent that such evaluation is subjective rather than objective in that it is dependent upon the ability of an individual to visually estimate the portion of the end hook which is wrinkled. It has been recognized that the two individuals may view the same seam and differ significantly in their estimation of the seam tightness by this method. It has also been recognized that since the evaluation is a visual estimation, it sometimes difficult for the individual to accurately confirm his own previous evaluation of the seam tightness on a specific can. Further, the tearing apart of the seam is a very time consuming operation with the resultant loss of the can and its contents. At the present time it is necessary to cut open and destroy many thousands of cans a day in can manufacturing plants and in food processing plants in the normal procedure of performing periodic spot examinations of the cans following the operation of double seaming an end thereto to check the tightness of the double seams being produced to assure that no cans passing to the ultimate consumer will have leaky seams.

In view of the foregoing, it is the primary object of this invention to provide a novel testing device which provides positive direct readings as to seam tightness; is in no way dependent upon individual human judgement or estimation; and does not harm the tested cans which may be passed on to the consumer.

Another object of this invention is to provide a novel double seam testing device which will accurately measure the interstitial space of the seam and thereby provide an accurate direct evaluation of the potential leakage tendency of such a seam.

Still another object of this invention is to provide a novel testing device which will automatically test ˌa double seam between a can end and a can body at a plurality of circumferentially spaced points, and which testing device may be repeatedly used on a can to obtain numerous readings in addition to the plurality of individual test positions by merely rotating such can.

Still another object of this invention is to provide a novel testing device for testing seams including double seams of cans, the testing device providing for the clamping of a portion of a seam at a predetermined pressure, and then further compressing a narrower zone of the clamped portion with an apparatus which will automatically provide a reading which directly indicates the amount of compression of the seams so as to give a direct reading as to the amount of interstitial space which is a direct indication of the tightness of the seam.

A further object of this invention is to provide a novel double seam testing device which utilizes an anvil or other type of fixed support which backs up the seam, a clamp member for clamping the seam against the anvil, the clamp member having a bifurcated end through which a blade-like probe passes and serves to compress a narrow zone of the already clamped portion of the seam to tightly squeeze together the various layers of the seam and to eliminate the space between the layers of the seam, and there being associated with the probe and the clamp means for measuring the relative movement of the probe with respect to the clamp to indicate the amount of interstitial space within the seam.

Still another object of this invention is to provide a testing device for testing the tightness of double seams of cans and the like, the tesing device further including means for testing he countersink depth of seams during the testing of the tightness of the seams.

Still another object of this invention is to provide a novel feed assembly for simultaneously feeding a clamp and a probe, and then individually feeding the probe relative to the clamp whereby a seam may be first clamped without there being a relative movement betwen the clamp and the probe, and then the probe individually actuated to further compress a central zone of the clamped portion of the seam.

Still another object of this invention is to provide a novel double seam testing device which provides for the relative movement of two seam engaging parts, there being provided a bleed valve controlled by this relative movement, and an air gage including a float carried by a column of moving air which corresponds to the bleeding of air through the bleed valve whereby the float will directly indicate the amount of space taken up in the seam when tightly clamped so as to provide for a direct reading of the tightness of the seam.

A still further object of this invention is to provide a novel testing device for seams including double seams of cans, the testing device including relatively movable clamp and probe, and means for indicating the relative movement of the probe with respect to the clamp, which movement is indicative of the tightness of the seam, the means for indicating the relative movement of the probe with respect to the clamp including a linear variable differential transformer and a direct reading gage.

With the above and other objects in view that will hereinafter appear, the nature of the invention will be more clearly understood by a reference to the following detailed description, the appended claims and the several views illustrated in the accompanying drawings.

In the drawings:

FIGURE 1 is a perspective view of the seam tightness testing device incorporating an air gage and shows the general details thereof.

FIGURE 2 is a schematic view with some parts shown in section and the other parts shown in elevation and clearly shows the operating features of the testing device.

FIGURE 3 is an enlarged plan view of the can engaging portion of the testing device and shows more clearly the details thereof.

FIGURE 4 is an enlarged fragmentary vertical sectional view taken generally on the line 4—4 of FIGURE 3 and shows more specifically the details of the device for engaging and clamping a seam of a can to test the tightness thereof.

FIGURE 5 is an enlarged fragmentary transverse vertical sectional view taken along the line 5—5 of FIGURE 4 and shows more specifically the means for feeding the clamp and probe of the testing device.

FIGURE 6 is an enlarged fragmentary horizontal sectional view taken along the line 6—6 of FIGURE 4 and shows the specific relationship of the clamp and probe with the seam being clamped by the clamp and the probe merely in touching contact with the outer surface of the seam.

FIGURE 7 is a sectional view similar to FIGURE 6 and shows the probe after it has compressed a zone of the previously clamped portion of the seam so as to eliminate the interstitial spaces within the seam at the particular point of engagement.

FIGURE 8 is an enlarged fragmentary vertical sectional view taken along the line 8—8 of FIGURE 7 and shows more specifically the engagement of the seam of the can during the testing thereof.

FIGURE 9 is a schematic view similar to FIGURE 2 and shows the use of an electrical system for indicating the tightness of seams.

FIGURE 10 is an enlarged fragmentary vertical sectional view rotated from FIGURE 8, for example, and shows the addition of a further test device for indicating and determining the height of the seam above the recessed end of the can which is the countersink depth of the seam.

Referring now to the drawings in detail, it will be seen that there is illustrated in FIGURE 1 a double seam testing device formed in accordance with this invention and generally referred to by the numeral 10. The testing device 10 utilizes an air gage for indicating the tightness of a seam. The testing device 10 includes a base, generally referred to by the numeral 11, which is generally composed of a peripheral frame 12 and a table 13. A generally inverted U-shaped support 14 rests on the rear portion of the table 13 and supports a gage unit, generally referred to by the numeral 15.

Referring now to FIGURE 3 in particular, it will be seen that the front part of the table 13 is provided with a seam clamping unit, generally referred to by the numeral 16. The seam clamping unit includes a centrally located anvil 17 and a plurality of circumferentially spaced clamp assemblies, generally referred to by the numeral 18.

Referring now to FIGURE 4 in particular, it will be seen that the table 13 is provided with an opening 20 in which there is seated a fitting 21 which includes an enlarged base 22 and an upstanding boss 23. The base 22 underlies the table 13 and is secured thereto by a plurality of circumferentially spaced fasteners 24. The boss 23 extends up through the opening 20 and locates the fitting 21. The anvil 17 is seated slightly above the upper surface of the table 13 as will be explained later, and is provided with a central bore 25 in which the boss 23 is snugly received so as to align the anvil 17 with the fitting 21 and to prevent any displacement of the anvil 17. The anvil 17 is provided at the upper end thereof with a recess 26 in which there is seated a flanged upper end 27 of a washer 28. The washer 28 is provided with a reduced lower portion 29 which is freely seated in the bore 25 in opposition to the boss 23. A centrally located fastener 30 extends down through the washer 28 and is threaded into the center of the fitting 21 whereby the washer 28 serves as a hold-down type of clamp for the anvil 17. It is to be noted that the washer 28 is fully recessed within the anvil 17 and does not come into any contact with any part being tested.

The anvil 17 is provided with an upper annular recess 30 which defines an upwardly facing shoulder 31. Also, the upper part of the anvil 17 is reduced as compared to the intermediate portion thereof and the anvil 17 is contoured at 32 so as to be snugly received within a recessed end of a can. It is to be understood that there is one anvil 17 for each size of can to be tested and while only one anvil has been shown, the anvils for the several can sizes may be substituted therefor.

As is clearly shown in FIGURE 3, the upper surface of the table 13 is provided with a plurality of radiating wear strips 33. The wear strips 33 are partially seated in recesses 34 in the upper surface of the table 13 and are clamped in place by means of fasteners 35. The wear strips 33 project slightly above the surface of the table 13. It is to be understood that the particular anvil 17 for the size can being tested is seated directly on the wear strips as opposed to resting on the table 13.

The several clamp assemblies 18 are identical, and only one of the clamp assemblies will be described in detail here. Referring to FIGURE 4 in particular, it will be seen that a typical clamp assembly 18 includes a support block 36 which has a lower portion 27 of a reduced width. The lower portion 37 of the clamp support block 36 is received in a radiating slot 38 in the table 13 whereby the position of the support block 36 may be readily adjusted by sliding the same with respect to the table 13.

A cover plate 40 overlies the support block 36 and the cover plate 40 is engaged by a pair of clamping lugs 41 which are disposed on opposite sides of the support block 36 and which have associated therewith fasteners 42. It will be readily apparent that when the fasteners 42 are released, the support block 36 may be readily adjusted and after being so adjusted, may be retained in its adjusted position by tightening the fasteners. The purpose of the movement of the support block 36 is to permit the testing device to accommodate cans of different diameters.

The lower portion 37 of the support block 36 is provided with a longitudinally extending, centrally located channel 43. The upper part of the support block 36 is also provided with a central channel 44 which opens through the upper surface and through the forward end of the support block 36, as is clearly shown in FIGURES 4 and 5. A vertical channel 45 extends between the channels 43 and 44 at the rear of the channel 44. Furthermore, another vertical channel 46 extends between the channels 43 and 44 to the rear of the forward ends of the channels 43 and 44 as viewed in FIGURE 4. It is to be noted that the construction of the forward end of the support block 36 is such as to define a nose 47 which is seated in the recess 30 of the anvil 17 so as to properly position the support block 36 with respect to the anvil 17 thereby assuring the proper positioning of the support block 36 with respect to the particular anvil being used not withstanding the fact that the anvils are interchangeable and the support blocks 36 are readily adjustable.

An elongated clamp 48 is slidably mounted in the channel 44. The clamp 48, as is clearly shown in FIGURES 6 and 7, has a tapered nose 49 which terminates in a slightly rounded face 50. The nose 49 is bifurcated and has a narrow slot 51 extending therethrough.

The forward part of the clamp 48 is provided with a downwardly opening channel 52 which is a continuation of the slot 51. A probe 53 is slidably mounted within the channel 52 and terminates in a forward blade-like portion 54 which is projectible beyond the face 50 through the slot 51.

A pivot pin 55 extends transversely of the lower portion 37 of the support block 36 across the channel 43 in alignment with the channel 46. A centrally located lever 56 is pivotally mounted on the pivot pin 45 and includes an elongated arm 57 which is disposed within the channel 43. A shorter, vertically disposed arm 58 of the lever 56 extends up through the channel 46 and is provided at the upper end thereof with an enlarged head 60 that is seated in a socket 61 formed in the underside of the probe 53.

A pair of outer levers 62 are pivotally mounted on the pivot pin 55 on opposite sides of the lever 56. Each of the levers 62 has a relatively short horizontal arm 63 disposed within the channel 43 and an upstanding arm 64 disposed within the channel 46 on opposite sides of the arm 58. The upper ends of the arm 64 are provided with heads 65 which correspond to the head 60 and which are seated in sockets 66 in the underside of the clamp 48.

A forward air cylinder, generally referred to by the numeral 67, is suspended from the support block 36 in alignment with the channel 43. A rear air cylinder, generally referred to by the numeral 68, is also suspended from the support block 36 in alignment with the channel 43. The air cylinders 67 and 68 are of the spring-returned type and the air cylinder 67 includes a plunger 69 while the air cylinder 68 has a plunger 70. The plungers 69 and 70 are disposed in alignment and are centered relative to the vertical center of the channel 43.

A connecting bar 71 extends between the undersides of the arms 63 in alignment with the plunger 69 and is rigidly secured thereto. An adjustable screw 72 is carried by the bar 71 in alignment with the arm 57 and is adjusted so that normally the forward end of the blade-like portion 54 is aligned with the face 50 of the clamp 48, as is shown in FIGURE 6. Thus when the plunger 69 is moved upwardly, and the levers 56 and 62 are simultaneously pivoted, the clamp 48 and the probe 53 will move in unison and with the forward edges thereof aligned.

It is to be noted that the arm 57 extends beyond the arms 63 and the bar 71. The plunger 70 is aligned with the arm 57 so that when it is projected, it may be engaged with the arm 57. When the plunger 70 pivots the lever 56, the pivoting of the lever 56 is independent of the lever 62 and the probe 53 is forced forwardly beyond the forward end of the clamp 48 in the manner shown in FIGURE 7.

Referring now to FIGURE 8 in particular, it will be seen that there is illustrated a portion of a conventional metal can, which is generally referred to by the numeral 73. The metal can 73 includes a can body 74 and a can end 75 which are connected together by a conventional double seam, generally referred to by the numeral 76. The double seam 76 is of a five ply construction and includes a chuck wall 77 which is directly connected to a recessed end panel 78 of the can end 75. The body wall 80 of the can body is disposed immediately adjacent the chuck wall 77. The centrally located layer of the double seam 76 is in the form of an end hook 81 of the can end 75. The body hook 82 of the can body 74 is disposed outwardly of the end hook 81. The outermost layer of the double seam 76 is in the form of a seaming wall 83. It is the amount of space between these five layers of the double seam 76 that determines the looseness or tightness of the double seam 76.

In the use of the testing device 10, the cylinder 67 is actuated to advance the clamp 48 and the probe 53 in unison to the positions shown in FIGURE 6. It has been found in practice that if approximately 38 pounds pressure is applied to the air cylinder 67, the necessary clamping action is obtained. At this time the chuck wall 77 is tightly against the surface of the anvil, and the end 50 of the clamp 48 is tightly against the seaming wall 83 without the double seam 76 being compressed. It is, of course, to be understood that the air pressure necessary to effect proper clamping may vary depending upon the diameter of the air cylinder 67 used, the size of the levers 62 and other factors.

The cylinder 68 is then actuated with the result that the probe 53 is advanced until the various layers of the double seam 76 are tightly clamped against each other and the spaces therebetween removed, as is shown in FIGURE 7. In order to accomplish this tight clamping of a small zone of the portion of the seam which has been clamped by the clamp 48, air at a pressure ranging from 40 pounds to 60 pounds per square inch is directed to the air cylinder 68. The movement of the probe 53 relative to the clamp 48 determined the tightness of the double seam 76. Here again the proper air pressure will depend on factors such as the size of the air cylinder 68 and lever 56, as well as other factors.

In the form of the invention illustrated in FIGURES 1 through 8, an air gage is utilized for the purpose of determining the movement of the probe relative to the clamp. Referring now to FIGURE 2 in particular, it will be seen that the air gage includes a transparent tube 84 which flares from the lower end thereof upwardly. A compressed air line 85 leads from the lower end of the tube 84 to a compressed air source 86. A valve 87 is mounted within the air line 85 and the valve 87 may be of the adjustable type. A pressure gage 88 is connected to the air line 85 to determine the pressure of the air passing therethrough.

The upper end of the tube 84 is closed and has a bleed line 89 extending therefrom. The bleed line is connected at its other end to a bleed valve, generally referred to by the numeral 90. Basically, the bleed valve 90 includes a housing 91 having a passage therethrough in which there is mounted an orifice plate 93 defining an orifice 95. The housing has a vent opening 96 disposed on the side of the orifice plate 93 remote from the bleed line 89. A valve member 97 is slidably mounted in the housing 91 for controlling the effective size of the orifice 95 and the flow of air therethrough. The valve member 97 is urged to the right by means of a spring 98 and is provided with a projecting portion 100 which is normally engaged with the probe 53. The housing 91 is accurately positioned within the clamp 48 and when the probe 53 is aligned with the clamp 48, the air gage should have a zero reading.

The air gage includes a float 101 which is mounted within the tube 84 and which is supported by the moving column of air passing through the tube 84 and out through the bleed line 89. Due to the fact that the tube 84 flares from the lower end to the upper end, it will be seen that the height of the float 101 is controlled by the volume of air passing through the tube 84. On the other hand, the volume of air passing through the tube 84 is controlled by the relative position of the valve member 97 and the orifice plate 93. The tube 84 will be provided with suitable indicia to indicate the position of the float 101.

In the illustrated form of the invention, there are three clamp assemblies 18 and for each clamp assembly there is a tube 84, as is clearly illustrated in FIGURE 1. If desired, the tubes 84 may have associated therewith a suitable control indicating plate 102 which will have marked thereon the acceptable range of tightness so it is merely necessary for the operator of the testing device 10 to take a quick glance at the positions of the floats 101 with respect to the control plate 102.

Although the testing device 10 illustrated herein has three clamp assemblies 18, it is to be understood that the number of clamp assemblies may be varied as desired and as far as room permits. However, if additional readings are required, it is merely necessary to release the can being tested, rotate the can slightly, and then obtain an additional set of readings.

Reference is now made to FIGURE 9 wherein there is illustrated schematically a system wherein the relative movement between the probe 53 and the clamp 48 may be indicated by electrical means. In the electrical system, there will be mounted in place of the bleed valve 90 a linear variable differential transformer, which is generally referred to by the numeral 103. The transformer 103 includes a primary winding 104 to which there are connected two lead wires 105 leading from a conventional source of alternating electrical energy. In opposition to the primary winding are two secondary windings 107 and 108 which are connected in series opposing. The transformer 103 also includes a bushing 110 having therein a shiftable iron core 111. The core 111 is spring-loaded by means of a spring 112 and has an extension 113 which normally bears against the probe 53.

Lead wires 114 and 115 lead from the windings 107 and 108, respectively, to an amplifier 116. Other lead wires 117 and 118 lead from the amplifier 116 and have connected thereacross a voltmeter 120 which is calculated to read in 0.001 inch increments to provide for a direct reading of the compression of the double seam being tested. If desired, a recording meter 121 may also be connected across the lead wires 117 and 118 to provide for a permanent recording of all readings. Lead wire 114 is provided with a normally open switch 112 which is closed only when it is desired to take a reading.

It is to be understood that other characteristics of the can 73 may be tested simultaneously with the testing of the seam. For example, the can may be tested for out of round and the like. Reference is made to FIGURE 10 wherein it is shown that a simple device may be provided for testing the countersink depth of the double seam 76, that is, the amount that the end panel 78 of the can end 75 is recessed. In FIGURE 10 it will be seen that the table 13 is provided with a bore 123 in alignment with the double seam 76 and in the bore 123 there is mounted a bleed valve, generally referred to by the numeral 124, the bleed valve 124 corresponding to the bleed valve 90. The bleed valve 124 has a valve member of which an extension 125 projects beyond a valve body 126 thereof for engagement with the double seam 76. The bleed valve 124 is connected to a suitable air gage by means of a bleed line 127. It is to be understood, of course, that the bleed valve 124 could be replaced by a linear variable differential transformer, such as the transformer 103 so that the reading can be obtained electrically. It is also to be understood that a plurality of the bleed valves or transformers may be spaced circumferentially around the anvil 17.

Although this application has been limited to the illustration and description of preferred embodiments of the invention, it is to be understood that other minor modifications may be made therein within the spirit and scope of the invention, as defined in the appended claims.

We claim:

1. A can seam compression testing device for testing a can seam of the type including wall portions and at least a single space therebetween, said device comprising a backing member, seam clamp means mounted for movement towards and away from said backing member for cooperation with said backing member for clamping a can seam therebetween, seam gaging probe means mounted for movement relative to said clamp, said probe means being movable toward said backing member for moving the wall portions of the can seam toward each other thereby decreasing the space between the wall portions at the clamped portion of a seam, and a gaging device reactive to the movement of said probe means relative to said clamp means and the movement of the wall portions for indicating the measured amount of space between the wall portions of the can seam.

2. A can seam compression testing device as defined in claim 1 wherein said device is at least in part carried by said clamp means and reactive to the movement of said probe means relative to said clamp means.

3. A can seam compression testing device for testing a can seam of the type including wall portions and at least a single space therebetween, said device comprising a backing member, a clamp mounted for movement towards and away from said backing member for cooperation with said backing member for moving wall portions of a can seam clamped therebetween toward each other thereby decreasing the space between the wall portions, a seam gaging probe mounted for movement relative to said clamp to gage the movement of the seam wall portions, said camp having a bifurcated seam engaging end, said probe being projectable through said clamp end, and a gaging device at least in part carried by said clamp and reactive to the movement of said probe relative to said clamp.

4. A can seam compression testing device for testing a can seam of the type including wall portions and at least a single space therebetween, said device comprising a backing member, a clamp mounted for movement towards and away from said backing member for cooperation with said backing member for moving wall portions of a can seam clamped therebetween toward each other thereby decreasing the space between the wall portions, a seam gaging probe mounted for movement relative to said clamp to gage the movement of the seam wall portions, a gaging device at least in part carried by said clamp and reactive to the movement of said probe relative to said clamp, first feed means for advancing said clamp and said probe as a unit, and second feed means for advancing said probe independently of said clamp toward said backing member during a gaging operation.

5. A can seam compression testing device for testing a can seam ef the type including wall portions and at least a single space therebetween, said device comprising a backing member, a clamp mounted for movement towards and away from said backing member for cooperation with said backing member for moving wall portions of a can seam clamped therebetween toward each other thereby decreasing the space between the wall portions, a seam gaging probe mounted for movement relative to said clamp to gage the movement of the seam wall portions, a gaging device at least in part carried by said clamp and reactive to the movement of said probe relative to said clamp, a first pivotally mounted lever for advancing said clamp, a second pivotally mounted lever for advancing said probe, and a unidirectional connection between said first and second lever to advance said probe simultaneous with an advance of said clamp.

6. A can seam compression testing device for testing a can seam of the type including wall portions and at least a single space therebetween, said device comprising a backing member, a clamp mounted for movement towards and away from said backing member for cooperation with said backing member for moving wall portions of a can seam clamped therebetween toward each other thereby decreasing the space between the wall portions, a seam gaging probe mounted for movement relative to said clamp to gage the movement of the seam wall portions, a gaging device at least in part carried by said clamp and reactive to the movement of said probe relative to said clamp, a first lever for advancing said clamp, a second lever for advancing said probe, a unidirectional connection between said first and second lever to advance said probe simultaneous with an advance of said clamp, and independent actuators for said first and second levers.

7. A can seam compression testing device for testing a can seam of the type including wall portions and at least a single space therebetween, said device comprising a backing member, seam clamp means mounted for movement towards and away from said backing member for cooperation with said backing member for clamping a seam therebetween, seam gaging probe means mounted for movement relative to said clamp, said probe means being movable toward said backing member for moving wall portions of a can seam toward each other thereby decreasing the space between the wall portions at a clamped portion of a seam, and a gaging device and reactive to the movement of said probe means relative to said clamp means for indicating the measured amount of space between the can seam wall portions, said gaging device being of an electrical type.

8. A can seam compression testing device for testing a can seam of the type including wall portions and at least a single space therebetween, said device comprising a backing member, seam clamp means mounted for movement towards and away from said backing member for cooperation with said backing member for clamping a seam therebetween, seam gaging probe means mounted for movement relative to said clamp, said probe means being movable toward said backing member for moving wall portions of a can seam toward each other thereby decreasing the space between said wall portions at a clamped portion of a seam, and a gaging device reactive to the movement of said probe means relative to said clamp means for indicating the measured amount of space between the can seam wall portions, said gaging device being of an electrical type and including a linear variable differential transformer.

9. A can seam compression testing device for testing a can seam of the type including wall portions and at least a single space therebetween, said device comprising a backing member, seam clamp means mounted for movement towards and away from said backing member for cooperation with said backing member for clamping a seam therebetween, seam gaging probe means mounted for movement relative to said clamp, said probe means being movable toward said backing member for moving wall portions of a can seam toward each other thereby decreasing the space between said wall portions at a clamped portion of a seam, and a gaging device reactive to the movement of said probe means relative to said clamp means for indicating the measured amount of space between the can seam wall portions, said gaging device being of an air pressure type.

10. A can seam compression testing device for testing a can seam of the type including wall portions and at least a single space therebetween, said device comprising a backing member, seam clamp means mounted for movement towards and away from said backing member for cooperation with said backing member for clamping a seam therebetween, seam gaging probe means mounted for movement relative to said clamp, said probe means being movable toward said backing member for moving wall portions of a can seam toward each other thereby decreasing the space between said wall portions at a clamped portion of a seam, and a gaging device reactive to the movement of said probe means relative to said clamp means for indicating the measured amount of space between the can seam wall portions, said gaging device being of an air pressure type having a variable air bleed orifice.

11. A can seam compression testing device for testing a can seam of the type including wall portions and at least a single space therebetween, said device comprising a backing member, seam clamp means mounted for movement towards and away from said backing member for cooperation with said backing member for clamping a seam therebetween, seam gaging probe means mounted for movement relative to said clamp, said probe means being movable toward said backing member for moving wall portions of a can seam toward each other thereby decreasing the space between said wall portions at a clamped portion of a seam, and a gaging device reactive to the movement of said probe means relative to said clamp means for indicating the measured amount of space between the can seam wall portions, said gaging device including an upright upwardly flaring tube, a constant pressure air source connected to a lower end of said tube, a bleed line extending from an upper end of said tube, a bleed valve connected to said bleed line and controlled by said probe means, and a float within said tube supported by a column of moving air passing through said tube.

12. A device for testing double seams of cans having recessed ends by a seam compression test, said device comprising an anvil adapted to have a can seated thereon with the seam of the can telescoped thereover, a plurality of clamps spaced around said anvil and mounted for movement towards and away from said anvil for cooperation with said anvil for clamping a seam at spaced points, a seam gaging probe for each clamp mounted for movement relative to a respective clamp to gage a clamped portion of a seam, and a gaging device reactive to the movement of the respective probe relative to the respective clamp first means for advancing said clamp, second means for advancing said probe, and means for actuating said first and second means for initially simultaneously advancing both said clamp and said probe and subsequently advancing only said probe.

13. The testing device of claim 12 wherein each clamp is carried by an adjustable support and said anvil is replaceable whereby different sizes of cans may be tested.

14. A can seam compression testing device for testing a can seam of the type including wall portions and at least a single space therebetween, said device comprising a backing member, seam clamp means mounted for linear reciprocal movement towards and away from said blacking member for cooperation with said backing member for clamping a seam therebetween, seam gaging probe means mounted for movement relative to said clamp means for determining the amount of interstitial space within a clamped portion of a seam, said probe means being movable toward said backing member for moving wall portions of a can seam toward each other thereby decreasing the space between said wall portions, a gaging device at least in part carried by said clamp means, first actuating means for simultaneously moving both said probe means and said clamp means toward said backing member thereby clamping a seam between said backing member and said clamp means, and second actuating means for moving only said probe means toward said backing member and beyond a portion of said clamp means to gage the amount of movement of the seam wall portions to determine the space therebetween and the condition of the seam.

15. The seam compression testing device as defined in claim 14 wherein said actuating means each include a pivoted member having first and second end portions, a first end portion of said pivoted members being operatively coupled to the respective clamp means and probe means, and individual means for selectively moving said second end portions to pivot said member to move said clamp means and said probe means toward the backing member only during a gaging operation.

16. The seam compression testing device as defined in claim 14 wherein said clamp means includes a bifurcuated seam engaging end, and said probe means is normally housed in said clamp means and is projectable through said bifurcated end after said clamp means has been moved by said first actuating means.

References Cited by the Examiner

UNITED STATES PATENTS

| | | | |
|---|---|---|---|
| 1,842,323 | 1/1932 | Gluzek | 73—81 X |
| 2,371,451 | 3/1945 | Larson | 33—172 X |
| 2,384,437 | 9/1945 | Boynton | 73—81 |
| 2,448,735 | 9/1948 | Pigott et al. | 73—120 |
| 2,499,665 | 3/1950 | Mestas | 336—134 |
| 2,636,379 | 4/1953 | Van Dorn | 73—37.5 |
| 2,849,876 | 9/1958 | Blosjo | 73—81 |
| 2,898,683 | 8/1959 | Kiefaber | 33—147 |

RICHARD C. QUEISSER, *Primary Examiner.*

DAVID SCHONBERG, *Examiner.*